No. 629,969. Patented Aug. 1, 1899.
E. J. SNOW.
CAR WHEEL.
(Application filed June 10, 1898.)

(No Model.) 2 Sheets—Sheet 1.

Witnesses
J. G. Hinkel
James W. Stevens

Inventor
Elmer J. Snow
by Foster & Freeman
Attorneys

THE NORRIS PETERS CO., PHOTO-LITHO., WASHINGTON, D. C.

UNITED STATES PATENT OFFICE.

ELMER J. SNOW, OF HILLBURN, NEW YORK, ASSIGNOR OF ONE-HALF TO WILLIAM W. SNOW, OF SAME PLACE.

CAR-WHEEL.

SPECIFICATION forming part of Letters Patent No. 629,969, dated August 1, 1899.

Application filed June 10, 1898. Serial No. 683,091. (No model.)

*To all whom it may concern:*

Be it known that I, ELMER J. SNOW, a citizen of the United States, residing at Hillburn, in the county of Rockland and State of New York, have invented certain new and useful Improvements in Car-Wheels, of which the following is a specification.

In the manufacture of car-wheels the use of wrought-metal center portions is advantageous, inasmuch as parts of the said portions may be advantageously used to secure to the center portions the steel tires necessary to be applied. The use of wrought-metal centers, however, is objectionable, inasmuch as owing to the flexibility of the center at the hub when the center is pressed onto the axle at a pressure sufficient to hold the wheel firmly in position the rigidity of the metal is overcome, the hub stretches, and the wheel is liable to become finally loose upon the axle. A cast-metal center has many advantages over one of wrought metal. Among others, it is not liable to stretch, as aforesaid, and the rigidity of the metal insures the retention of the wheel upon the axle. As ordinarily constructed, however, it is difficult to secure the steel rim to the cast-metal center, as the center cannot be bent to lock the rim in place, nor has it the strength to afford a secure hold if the rim is bent to lock with the center; and the object of my invention is to overcome this objection, and to this end I construct the parts so that the rim can be bent and securely locked to a part of the center having sufficient strength to resist the locking-pressure and afford a secure hold, as fully set forth hereinafter and as illustrated in the accompanying drawings, in which—

Figure 1:
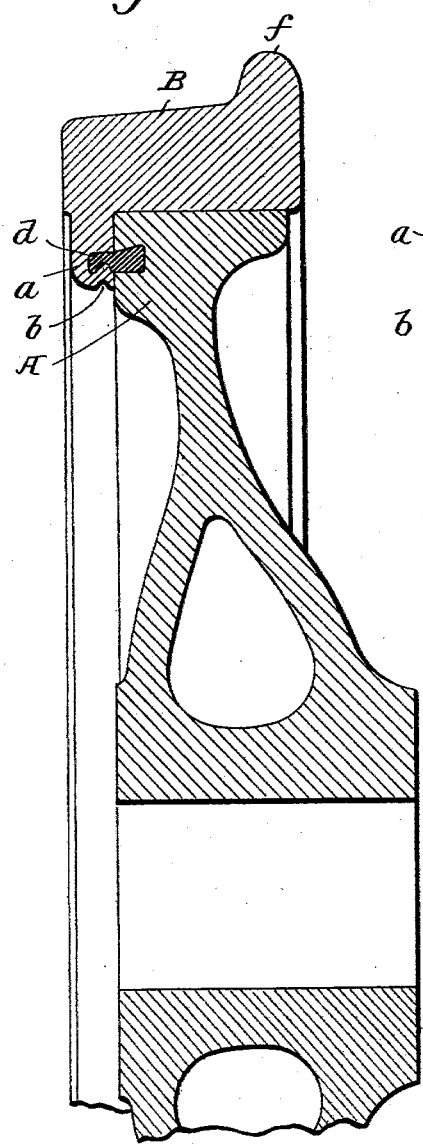
Figure 2:
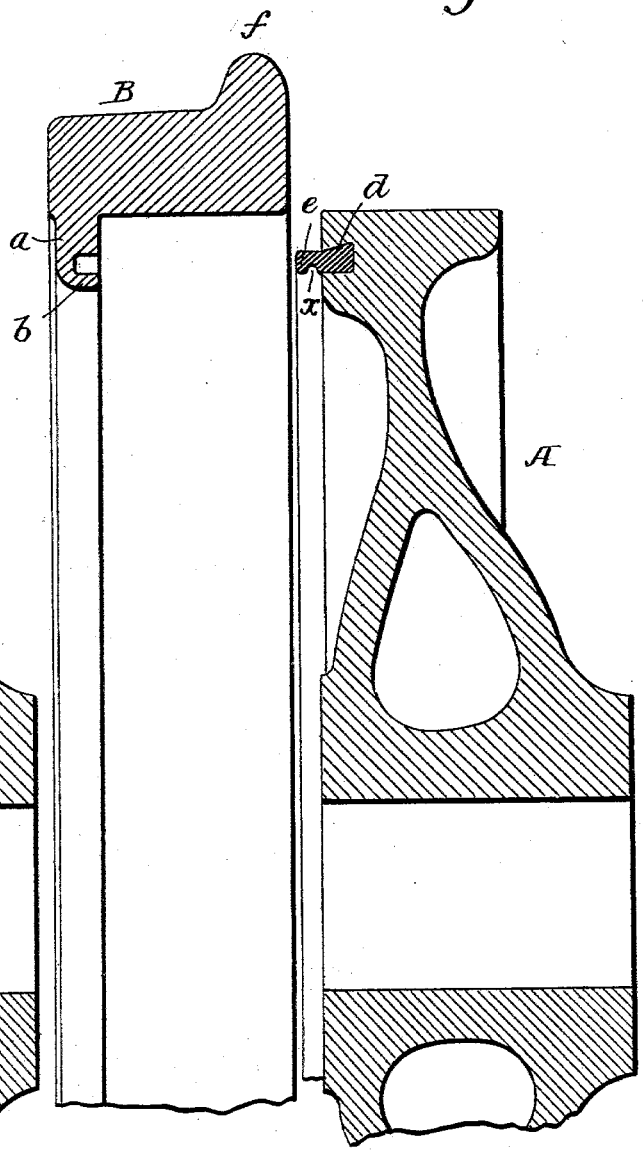

Figure 1 is a transverse sectional elevation of a car-wheel having my improvement; Fig. 2, a view illustrating the position of the parts prior to locking the rims or tires to the wheel-body; and Fig. 3, a face view of the center portion, illustrating a modification.

The center or body A of the wheel is of cast metal of any usual or suitable form, and the rim or tire B is of steel, with an annular flange at the outer side bearing against the outer face of the rim of the center A and with the usual flange $f$ adjacent to the tread at the inner side of the tire. The meeting faces of the center and the tire may be slightly beveled; but, as shown, they are parallel to the axis of the wheel.

In order to securely retain the tire upon the wheel and at the same time permit its removal, if necessary, I fasten or secure in the body or center A of the wheel a retainer or locking-piece $d$, which, as shown in Figs. 1 and 2, is a ring of wrought or other malleable metal capable of resisting without breaking the pressure bought against it and dovetailed or thickened toward the inner end, so that when the center A is cast upon the same a portion of the retainer $d$ will project beyond the outer face of the center near the rim, and in this projecting portion there is a groove or recess $x$ and beyond the latter a lip $e$, extending inward.

In the manufacture of the tire B the outer flange $a$ is of such dimensions that the tire can be applied to the center A with the inner face of the flange $a$ bearing against the outer edge of the retainer $d$, as shown in Fig. 2, and in the inner edge of the flange $a$ a groove is cut whose sides are parallel to each other and to the axis of the wheel, so as to admit of the reception of the retainer portion of the center when the wheel is assembled. After the tire B has been put into position, as indicated in Fig. 1, the lip or flange $b$ is forced outward by pressure by means of a roller or otherwise, so that the lip or flange $b$ is forced in the recess $x$ of the retainer $d$, extending thus back of the lip $e$ of the said retainer, as shown in Fig. 1, whereby there is such an engagement of the parts that the tire B cannot be forced outward by any pressure which may be applied to the same, the retainer holding the tire in place, while the strains which tend to thrust the tire inward are resisted by the contact of the flange $a$ with the rim of the center A.

It will be seen that the retainer $d$ has a positive bearing against the inner face of the flange $a$, so that when the flange or lip $b$ is forced outward against the retainer the latter has a strong unyielding support that will permit the lip to be forced down firmly into engagement with the projecting portion of the retainer to secure a positive locking of the parts together. It will also be evident that should there be any irregularities in the opposing bearing-surfaces of the retainer $d$ and the flange $a$ or any other cause which would result in subjecting the retainer to unequal strains during the process of forcing the lip $b$ into the groove $x$ the retainer $d$ will on account of its malleability be enabled to yield slightly or otherwise accommodate itself to withstand such strains without breaking and possesses the requisite strength for this purpose.

When it becomes necessary to re-tire the wheel, it is only necessary to sever the lip or flange $b$ beyond the lip $e$ or sever that portion of the flange forward of the retainer, when the tire can at once be forced off the wheel, leaving the center intact and ready for the application of a new tire.

The retaining device may be of any suitable malleable material and construction, provided it affords a bearing against which to bend the lip $b$ of the tire, so as to prevent the latter from being thrust outward by any thrusts which come upon the flange $f$ in coming in contact with frogs, switches, or guard-rails.

Figure 3:
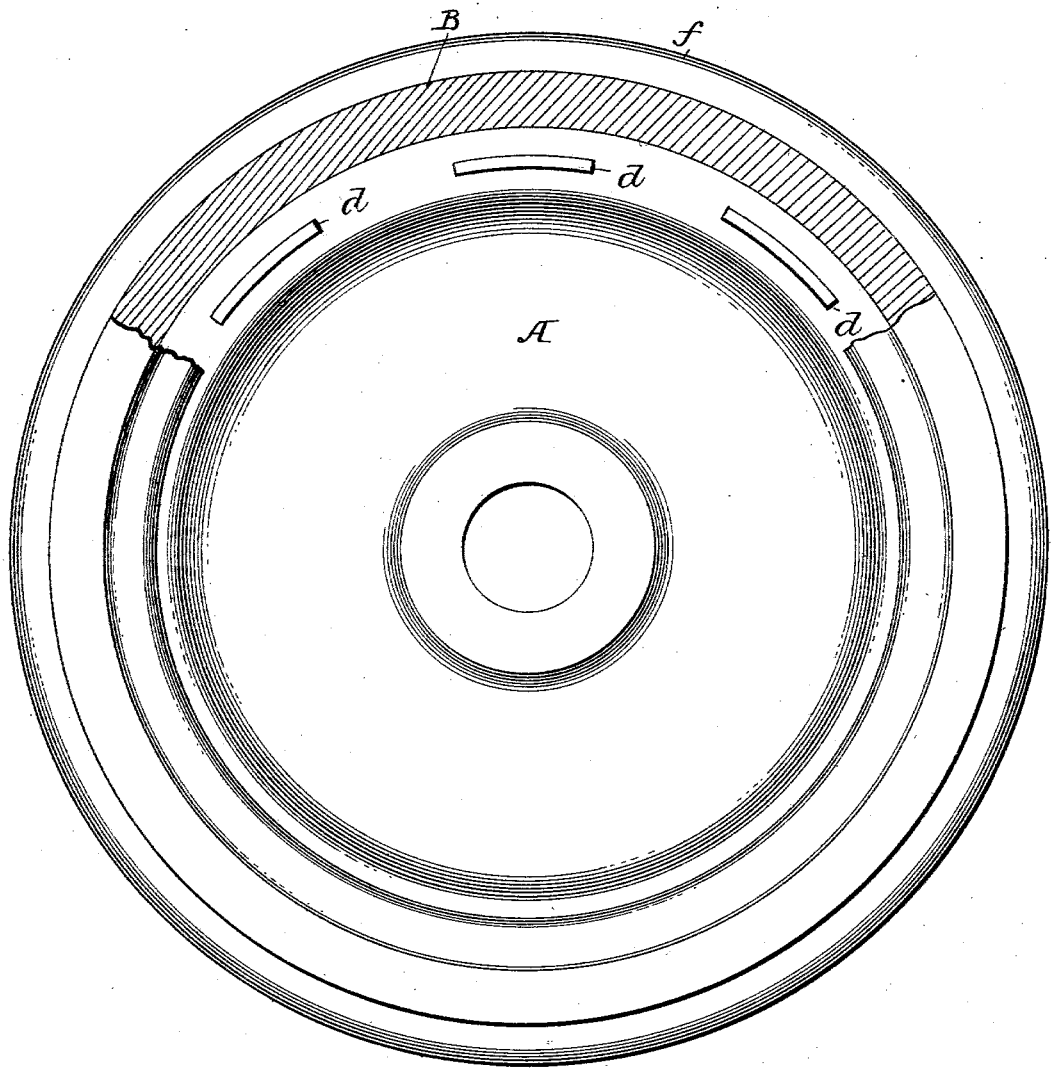

While I have referred to the retainer $d$ as being in the form of a ring, it may be in sections arranged at intervals upon the body or center A, as illustrated in Fig. 3.

Without limiting myself to the precise construction and arrangement of parts shown, I claim as my invention—

1. A car-wheel having a cast-metal center and a retainer $d$ of malleable metal connected therewith, and a tire provided with a lip bent to engage the retainer, substantially as set forth.

2. The combination in a car-wheel, of the cast-metal center A, a retainer of malleable metal projecting from the outer face of the center and provided with a lip $e$, and a tire provided with a deep flange $a$ bearing against the outer face of the center and with a lip $b$ bent to engage the lip $e$, substantially as set forth.

3. The combination with the cast-metal center of a car-wheel, of a retainer of malleable metal having an enlarged portion embedded in the center, and a portion provided with a lip projecting beyond the outer face of the center, substantially as set forth.

4. A car-wheel having a cast-metal center portion, a retainer of malleable metal cast therein, and a steel tire having a portion interlocked with the retainer, substantially as set forth.

In testimony whereof I have signed my name to this specification in the presence of two subscribing witnesses.

ELMER J. SNOW.

Witnesses:
G. W. CONKLIN,
JOHN F. REGAN.